United States Patent Office.

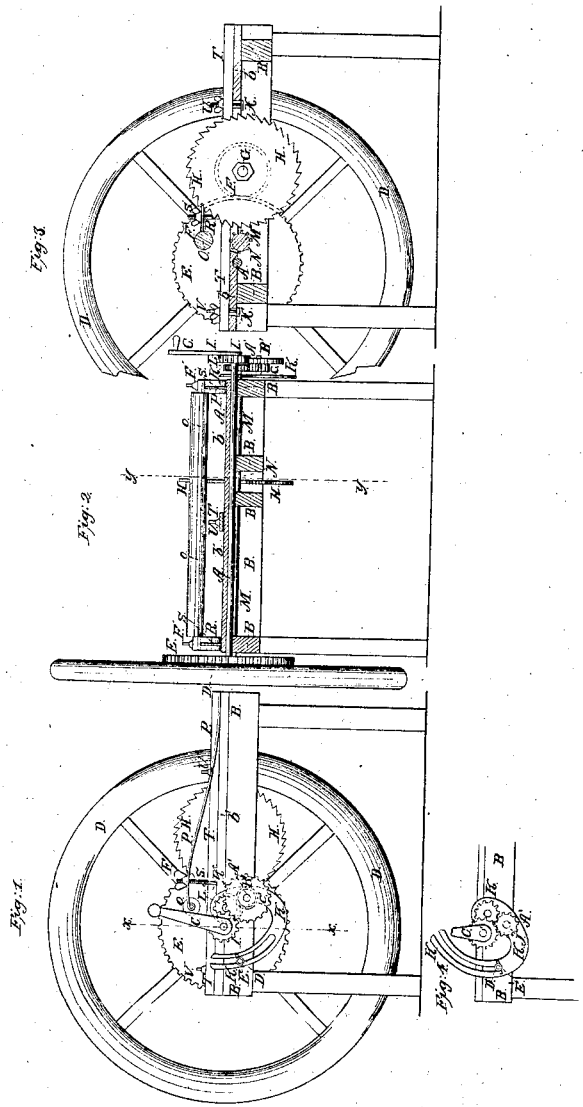

I. M. MARSTON AND H. R. HULING, OF ROXBURY, MASSACHUSETTS.

*Letters Patent No. 61,079, dated January 8, 1867.*

IMPROVEMENT IN SAWING MACHINES.

*The Schedule referred to in these Letters Patent and making part of the same.*

TO ALL WHOM IT MAY CONCERN:

Be it known that we, I. M. MARSTON and H. R. HULING, of Roxbury, in the county of Norfolk, and State of Massachusetts, have invented a new and useful Improvement in Hand-Sawing Machine; and we do hereby declare that the following is a full, clear, and exact description thereof, which will enable others skilled in the art to make and use the same, reference being had to the accompanying drawings, forming a part of this specification, in which—

Figure 1 is a side view of our improved sawing machine.

Figure 2 is a vertical cross-section of the same, taken through the line $x\ x$, fig. 1.

Figure 3 is a vertical longitudinal section of the same, taken through the line $y\ y$, fig. 2.

Figure 4 is a detail view of a portion of the side of the machine, showing the larger gear-wheel replaced with a smaller one.

Similar letters of reference indicate like parts.

Our invention has for its object to furnish an improved hand-sawing machine, by means of which sawing may be done easier, better, faster, and consequently cheaper than by other machines; and it consists, first in the combination and arrangement of the curved and slotted support for the spindle of the exchangeable gear-wheels with the lower feed-roller, with the screw and with the frame of the machine; and second, in the combination and arrangement of the springs with the upper feed-roller, with the rods, and with the frame of the machine, as hereinafter more fully described.

A is the drawing-shaft, which revolves in bearings in the frame B of the machine. To one end of this shaft is attached the crank C, by means of which the machine is driven. To the other end of the shaft A is attached the fly-wheel D, which should be of sufficient size and weight to impart the proper amount of momentum to the machine. To the shaft A, between the fly-wheel D and the side of the frame B of the machine, is attached a cog-wheel, E, which meshes into a smaller cog-wheel, F, (shown in dotted lines in fig. 3,) attached to the saw-shaft G. The saw-shaft G revolves in bearings in the frame B, and carries the saw H upon its inner end. By this arrangement of the gear-wheels E and F in connection with the shafts A and G, an increased velocity and reversed motion are given to the saw, which enables it to make an easier and smoother cut. To the driving-shaft A, between the crank C and the side of the frame B of the machine, is attached a cog-wheel I. K is a support, to which the spindle A' is attached, upon which the cog-wheels B' and C', or the cog-wheel J, revolve. One end of the support K is pivoted to the lower feed-roller M, the end of which passes through a hole formed in the said end of the said support K. The other end of the support K is slotted, as shown in figs. 1 and 4, through which slot passes the projecting end of the screw E', attached to the side of the frame B, upon the end of which screws the thumb-nut D', by means of which the said support K is securely held in any desired position. The support K is curved in the form shown in figs. 1 and 4, so that, as the support K is moved back and forth along the screw E', the distance between the spindle A' and the cog-wheel I may be varied, while the distance between the spindle A' and the cog-wheel L remains constant. This allows different-sized gear-wheels to be placed upon the spindle A', so as to regulate the feed of the machine at pleasure. B' is a gear-wheel, fitting and working upon the spindle A', and the teeth of which mesh into the teeth of the gear-wheel I, as shown in fig. 1. To the inner side of the gear-wheel B' is securely attached the small gear-wheel C', which is of such a size that its teeth may mesh into the gear-wheel L, attached to the edge of the lower feed-shaft M. When it is desired that the feed of the machine should operate slower, the gear-wheels B' and C' may be replaced by the gear-wheel J, and the support K so shifted as to bring the teeth of the said gear-wheel in contact with the teeth of the gear-wheel I. The cog-wheel J is made so long that both the wheels I and L may mesh into it, as shown in fig. 2. The cog-wheel L is attached to and revolves the lower feed-roller M. This roller revolves in bearings in the frame B of the machine, and is furnished with projecting spurs, N, to insure its action upon the timber being fed to the saw. The upper feed-roller O revolves in bearings formed in the ends of the two steel springs P R, as shown in the drawings. The other ends of these springs, P R, are attached to the frame B of the machine, and they are held in the proper position to impart the requisite pressure to the timber, being fed forward to the saw by the rods S and thumb-nuts F'. This arrangement allows the springs P and R to give, both in front and rear of the said rods, S, and insures a steady and uniform pressure upon the timber while being fed forward to the saw. T is the guide, along which the edge of the timber to be sawn is fed, so as to insure the strips being always of the same breadth. This guide is held in place by set-screws, U and V, passing up through the table $b'$ of the machine, and it is made adjustable by said set-screws passing up through slots X formed in said table $b'$ as shown in fig. 3.

Having thus described our invention, we claim as new, and desire to secure by Letters Patent—

The slotted curved support K attached to the lower feed-roller M and screw E, for the purpose of allowing different-sized gear-wheels to be placed upon the spindle A' of the support K, so as to regulate the feed of the machine, when all are constructed and arranged as herein shown and described.

I. M. MARSTON,
H. R. HULING.

Witnesses:
GILES H. RICH,
THADS. C. CRAFT.